(12) United States Patent
Nyman et al.

(10) Patent No.: US 7,390,420 B2
(45) Date of Patent: Jun. 24, 2008

(54) METHOD AND EQUIPMENT FOR COMPRESSING A DISPERSION IN LIQUID-LIQUID EXTRACTION

(75) Inventors: Bror Nyman, Ulvila (FI); Stig-Erik Hultholm, Pori (FI); Eero Ekman, Pori (FI); Launo Lilja, Pori (FI); Juhani Lyyra, Espoo (FI); Pertti Pekkala, Espoo (FI); Raimo Kuusisto, Espoo (FI)

(73) Assignee: Outotec Oyj, Espoo (FI)

( * ) Notice: Subject to any disclaimer, the term of this patent is extended or adjusted under 35 U.S.C. 154(b) by 518 days.

(21) Appl. No.: 10/514,877

(22) PCT Filed: May 15, 2003

(86) PCT No.: PCT/FI03/00378

§ 371 (c)(1),
(2), (4) Date: Nov. 16, 2004

(87) PCT Pub. No.: WO03/097207

PCT Pub. Date: Nov. 27, 2003

(65) Prior Publication Data

US 2005/0224410 A1    Oct. 13, 2005

(30) Foreign Application Priority Data

May 16, 2002   (FI) ................................. 20020926

(51) Int. Cl.
*B01D 21/02* (2006.01)
*B01D 21/00* (2006.01)
(52) U.S. Cl. .............. 210/802; 210/634; 210/511; 210/521; 210/532.1; 422/256; 422/257; 422/258; 422/259

(58) Field of Classification Search ............. None
See application file for complete search history.

(56) References Cited

U.S. PATENT DOCUMENTS

| | | | | | |
|---|---|---|---|---|---|
| 2,708,520 | A | * | 5/1955 | Dallas | 210/525 |
| 4,469,582 | A | * | 9/1984 | Sublette et al. | 204/666 |
| 4,643,834 | A | * | 2/1987 | Batutis | 210/740 |
| 4,747,948 | A | * | 5/1988 | North | 210/633 |
| 4,957,628 | A | * | 9/1990 | Schulz | 210/519 |
| 6,099,743 | A | * | 8/2000 | Pedersen | 210/801 |
| 6,558,558 | B1 | * | 5/2003 | Hall | 210/802 |
| 2003/0127376 | A1 | * | 7/2003 | Maddock et al. | 210/114 |

FOREIGN PATENT DOCUMENTS

| | | |
|---|---|---|
| AU | 74258/94 | 12/1997 |
| DE | 2426264 | 12/1975 |
| DE | 2922721 | 12/1980 |

* cited by examiner

*Primary Examiner*—Krishnan S Menon
(74) *Attorney, Agent, or Firm*—Morgan & Finnegan, L.L.P.

(57) ABSTRACT

The invention relates to a method for controlling and compressing a dispersion formed in the mixing stage of liquid-liquid extraction. The compression of the dispersion is achieved by reducing the cross-section of the separation section in the direction of flow and by equipping the separation section with a dispersion-damming member. The equipment according to the invention thus comprises a settler, which is essentially trapezoid in shape so that its cross-section is wider at the feed end of the settler and gets smaller towards the rear end of the settler, from whence the separated solutions are discharged from the settler, and the settler is equipped with at least one device to dam up the dispersion. In particular the method and equipment relate to the extraction process used in the recovery of metals.

23 Claims, 3 Drawing Sheets

METHOD AND EQUIPMENT FOR COMPRESSING A DISPERSION IN LIQUID-LIQUID EXTRACTION

FIELD OF THE INVENTION

The invention relates to a method for controlling and compressing a dispersion formed in the mixing stage of liquid-liquid extraction. The compression of the dispersion is achieved by reducing the cross-section of the separation section in the direction of flow and by equipping the separation section with a dispersion-damming member. The equipment according to the invention thus comprises a settler, which is essentially trapezoid in shape so that its cross-section is wider at the feed end of the settler and gets smaller towards the rear end of the settler, from whence the separated solutions are discharged from the settler, and the settler is equipped with at least one device to dam up the dispersion. In particular the method and equipment relate to the extraction process used in the recovery of metals.

BACKGROUND OF THE INVENTION

Liquid-liquid extraction has been used earlier in the metallurgical industry typically in the processing of solutions with a weak valuable metal content. Many large copper and uranium recovery extraction plants fall into this category. With regard to copper, however, the situation is changing, because the extraction feed solutions are becoming noticeably stronger with the pressurised concentrate leaching processes coming into operation. Likewise some cobalt and zinc extraction processes also treat strong feed solutions. Nevertheless, the size of the equipment, particularly in the case of copper, will generally remain large, also in the new pressurised leaching processes.

In all extraction processes a valuable metal-containing aqueous solution is brought into contact with an organic solution in the extraction mixing section, forming a dispersion of two solutions that are insoluble in each other. The solutions in the dispersion are separated from each other in the separation section of extraction, where the solutions separate from each other into two layers with a dispersion band remaining between them. During the mixing stage, either one or more of the valuable metals in the aqueous solution is transferred to the organic phase, from which the valuable metals are recovered by stripping the aqueous solution. Extraction is performed in an equipment, where the mixing and separation sections are either located one on top of the other (column) or in series on more or less the same level horizontally. Almost always in cases when large-scale extractions of weak solutions are concerned, such as copper extraction, the equipment is positioned in an essentially horizontal position. When we refer to extraction hereinafter, the term is used for various arrangements, but essentially equipment in the same level.

The separation section in extraction is conventionally rectangular in cross-section or in some special cases square. For instance in U.S. Pat. No. 6,132,615 the settler described is of rectangular shape. The settler is equipped with several picket fences.

SUMMARY OF THE INVENTION

Now a method has been developed for controlling and compressing a dispersion formed in the mixing stage of liquid-liquid extraction. The compression of the dispersion is achieved by reducing the cross-section of the separation section in the direction of flow and by equipping the separation section with a dispersion-damming member. The equipment according to the invention thus comprises a settler, which is basically trapezoid in shape so that its cross-section is wider at the feed end of the settler and gets smaller towards the rear end of the settler, from whence the separated solutions are discharged from the settler, and the settler is equipped with at least one device to dam up the dispersion. In particular the method and equipment relate to the extraction process used in the recovery of metals.

The essential features of the invention will be made apparent in the attached claims.

In the mixing section of extraction equipment i.e. in the mixer, a dispersion formed of two extraction liquids is fed into the separation section i.e. settler. It is clear that the portion of the dispersion in the front end of the settler is dominant. However, it is required to compress the dispersion so the cross-section of the settler is reduced in the direction of flow and at the same time the settler is equipped with at least one member which will in addition accomplish the damming and compressing of the dispersion. The member causing the damming is located in the settler, essentially in the direction of the end walls, the feed end and rear end. The damming member can be either a traditional picket fence or preferably a revert member, with the effect of turning the flow direction of the dispersion to a mainly vertical one. The damming member compresses the dispersion in the direction of flow and the elevation of the dispersion, and the settler with its diminishing cross-section in the direction of flow achieves further compression laterally.

The reduction of the cross-sectional area of flow in the separation section is at the same time a method to even out the dispersion stream and to control the progression of the dispersion towards the rear end of the separation section in the intermediate spaces between the damming members. As the stream moves forward in the separation section and the solutions separate from the dispersion into their own layers, the dispersion band becomes thinner unless the cross-sectional area is reduced. Gravity for its part evens out the thickness of the dispersion layer, because it causes the dispersion to flow towards the rear end of the separation section. However, this correspondingly weakens the separation capacity of the settler, especially as all additional flow movements in themselves slow down separation.

Using the method and equipment of this invention, solutions separating from each other can be made to move forward at an even rate in both a lateral and vertical direction in conditions arranged for separation. These include the fact that the solutions are made to move forward in a plug flow manner from the front end of the separation section to the tail end. One aim of the method in the present invention is to speed up the separation of the solutions from the dispersion and to improve the final separation efficiency of the solutions i.e. to reduce the entrainment of each solution in the other. A compact dispersion formed by damming enables an improved degree of solution separation i.e. the amount of entrainment in each solution is decreased. The flow movement achieved by gravity also lessens the impact of a compact dispersion.

A thick dispersion band at the front end of the separation section promotes good droplet separation. Thus it is preferable that the thickness of the dispersion band at least in the first third of the separation section is about 75% of the height of the solution and decreases gradually.

The reduction of the cross-section of the flow in the separation section in the direction of flow causes the flow rate of the solution to increase. The rise in flow rate of the aqueous solution towards the rear end of the separation section keeps the aqueous solution flowing forwards evenly along the bottom layer. The linear speed of the organic solution is not of course allowed to increase above the critical limit, above which the amount of entrainment of aqueous solution in the organic solution begins to grow. The linear speed limit of the organic solution in this case can be considered to be 70 mm/s.

The shape of the settler, where the cross-section of the feed end is wider than the rear end, can be achieved in many ways. One such is a trapezium that narrows symmetrically on both sides. The cross-section of the settler can also be reduced asymmetrically, for example a trapezium can also narrow on only one side, whereby one side of the settler is perpendicular to both the feed end and the rear end, but the other side is in an oblique position in relation to the end walls. The reduction of the cross-section is in proportion to the depth of the settler also, so that at its smallest, the width of the rear end of the settler is in the range of 30-60% of the width of the feed end.

The settler, with a cross-section decreasing in the direction of flow, is of course equipped with the appropriate equipment. Thus one or several picket fences or other equivalent elements are located in the settler feed end, enabling a dispersion fed mainly to one point to be distributed evenly over the whole of the cross-section of the settler.

In addition, so that the dispersion fed into the separation section is spread over the whole of the cross-section of the settler it is also equipped with at least one member to dam up the dispersion. The traditional picket fence that can be used was mentioned earlier. Instead of a picket fence, the separation section or settler can be equipped with at least one revert member or both can be used. The preferred number of revert members is 3-5.

Using a revert member, the phases separated from the dispersion are made to flow relatively freely along the longitudinal axis of the separation section, but the unseparated dispersion is dammed up using a damming revert member placed in the separation section. The revert member extends right up to the sidewalls of the separation section. The equipment in accordance with the invention comprises at least one revert member located in the settler (separation section), said revert member comprising at least two, plate-like sections, or revert plates, which are at different heights and essentially set perpendicularly to the longitudinal axis of the settler (in the direction of the solution flow). In the area formed between the revert plates, the revert channel, the direction of the dispersion flow is almost vertical, because the dispersion is made to flow above or below each revert plate into the revert channel. Changing the direction of flow of the dispersion at least once in the separation section improves the separation of the dispersion into pure solution layers above and below the dispersion. The revert member can be positioned at different stages of extraction, such as both in the actual extraction and also in any washing and stripping separation sections.

The dispersion stream is prevented from flowing forwards directly in the settler by arranging at least one revert member extending above the separation section. In order for the dispersion to move past the revert member, in the first stage it must be pressed against the first plate-like part of the revert member and under it into the revert channel, which is formed between the plate-like parts of the revert member. From the revert channel the dispersion surface is made to rise so that it is able to flow over the second plate-like part of the revert member. The number of revert members in the separation part of the extraction is at least one, but can vary for instance between 1 and 6. There are at least two plate-like parts in one revert member, but the number of said parts can also vary, for instance between 2 and 6. The first plate-like part of the revert member and subsequently every second part is located essentially higher in the separation section than the second plate-like part and every other part after that.

The first plate-like part belonging to the revert member, i.e. the first revert plate, is located in the separation section at a level where its upper edge extends above the dispersion band into the organic solution phase. When the separated solutions and the dispersion band between them flow from the feed end of the separation section towards the discharge end, the dispersion band is pressed against the first revert plate. The positioning of the revert plates determines the desired thickness of the organic solution layer. The dispersion should accumulate in such quantities that because it is heavier than the separated organic solution it penetrates through the riser channel or channels between the revert plates to the next section of the separation section, where the thickness of the layer of separated solutions is greater than in the previous section. The organic and aqueous solutions that have already separated into their own phases, are able to flow freely at the revert member into the next section of the separation section, but the dispersion has to collect in a layer of sufficient thickness before it is able to enter the next section of the separation section via the revert member. The dispersion moves forward only when the separation section is charged with a sufficiently large flow. The larger the settler, the larger the flow required.

The first revert plate is mainly solid, but has vertical slots in its upper section, which ensure an even flow-through of the organic solution at the revert member along the whole length of the separation section. The first revert plate extends above the surface of the organic solution, as do the slots in its upper edge. The slots going down from the top edge of the revert plate reach a depth equivalent to a maximum of half that of the thickness of the layer of separated organic solution. The slotted zone accounts for about 5-15% of the total height of the revert plate. The lower edge of the first revert plate extends to the bottom part of the separation section, but however to such a distance from the bottom that it is within the prevailing dispersion layer. The distance of the lower edge from the bottom is greater the further away the revert member is from the feed end of the separation section. In practice, the lower edge of the first revert plate is at a distance from the bottom that is 12-50% of the total depth of solution in the separation section (settler).

The second revert plate of the revert member is the same type as the first i.e. basically solid. The lower edge of the second revert plate is placed far lower than the lower edge of the first revert plate, but however, so that there is space for the separated aqueous solution to flow unimpeded. The distance of the lower edge of the second revert plate from the bottom depends on the location of the revert member in the separation section. The lower edge of the revert plate is higher in the separation section, the further away the revert member is from the feed end of the separation section. In practice, the lower edge of the second revert plate is at a distance from the bottom that is 5-35% of the depth of solution in the separation section. The upper edge of the second revert plate is located below the surface of the organic solution, and the distance of the upper edge from the surface of the organic solution is greater the further away the revert member is from the feed end of the separation section. In practice, the upper edge of the second revert plate is at a distance below the surface of the solution that is 12-35% of the total solution depth in the separation section.

The even distribution of the dispersion into the revert channel and an even flow out of it is made easier if the lower end of the first revert plate of the revert member is also provided with an equivalent type of slotted zone as that on the upper end of the same revert plate. Likewise, it is preferable to furnish the top end of the second revert plate with a slotted zone and the purpose of the slots in this case too is to promote the even distribution of the dispersion into the separation section. If the revert member is composed of several revert plates, the slotted zones are located on the upper and lower edges of the corresponding plates. The height of the slotted zones on the lower edge of the first revert plate and the upper edge of the second plate is in the range of 5-15% of the height of the revert plate.

If the revert member is made up of more than two revert plates, the bottom clearance of the lower edge of the third revert plate is 0-30% larger than that of the first revert plate. The distance of the third revert plate from the surface of the organic solution is 10-30% smaller than the distance of the second plate. Both the bottom clearance and the distance from the surface of the organic solution of the fourth revert plate are 0-30% greater than that of the second revert plate.

The use of a revert member reduces the amount of organic solution entrainment in the aqueous solution, so that the entrainment content in the aqueous solution entering stripping remains less than 10 ppm, generally between 2-7 ppm. For example, in copper extraction the recovery of copper takes place by electrolysis in an electrowinning circuit. The electrolysis process cannot tolerate an organic solution, and if the solution entering electrolysis is not sufficiently pure, it must be purified for example by flotation or pressure filtration. A separation section with a diminishing cross-section and the use of a revert member facilitates in particular the direct routing of the solution produced in extraction to further processing without separate purification stages.

An arrangement in accordance with this invention enables the reduction of the amount of the dispersion that remains unseparated at the tail end of the separation section, so that it is at most 10% of the thickness of the solutions in the separation section. It is also possible using this method to regulate the thickness of the layer of organic solution. The thickness of the layer of organic solution is regulated gradually in accordance with the number of revert members used.

The method and equipment are intended particularly for the extraction of metals, where the metal to be recovered is one of the following: copper, uranium, cobalt, nickel or zinc.

BRIEF DESCRIPTION OF THE DRAWINGS

The invention is described further in the attached drawings, where.

DETAILED DESCRIPTION OF THE INVENTION

Figure 1:
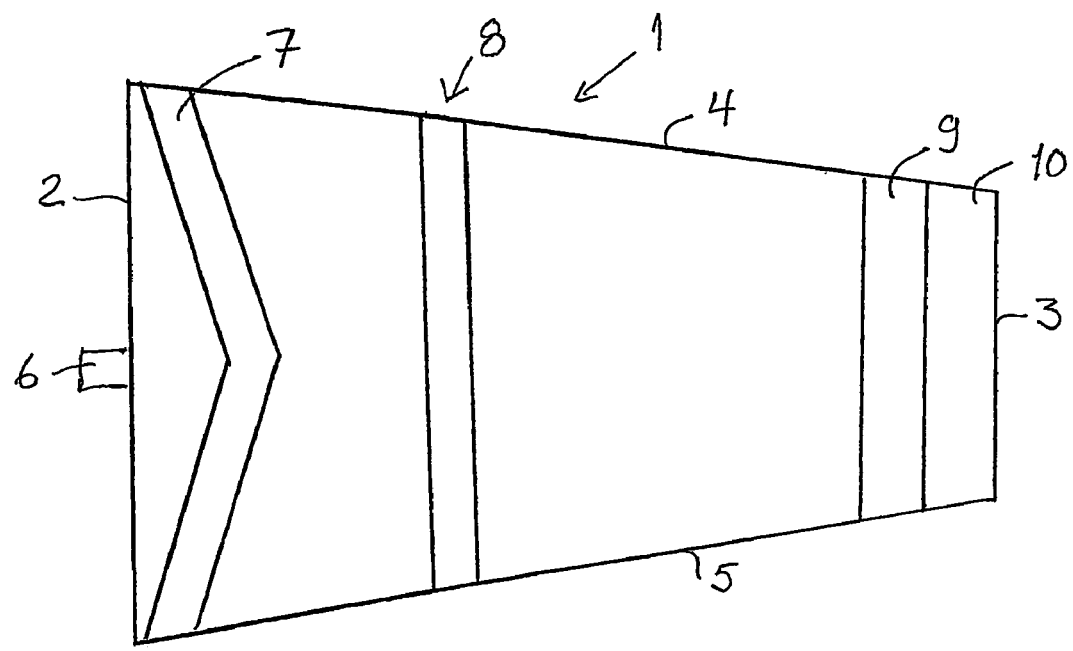
FIG. 1 is a cross-section of an embodiment of a settler in accordance with the invention.
Figure 2:
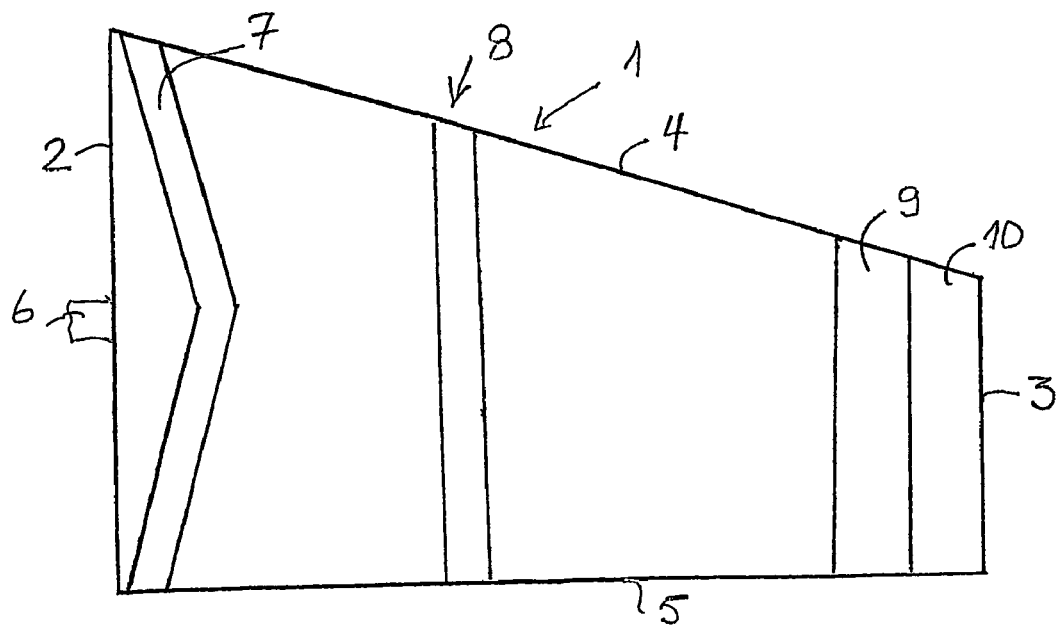
FIG. 2 is a cross-section of another embodiment of a settler in accordance with the invention.

FIGS. 1 and 2 show a settler 1, which is composed essentially of a vertical feed end 2, rear end 3, sidewalls 4 and 5. In FIG. 1 both the sidewalls 4 and 5 narrow in the direction of the flow in the settler. In FIG. 2 one sidewall is perpendicular to the feed and rear ends, and the other is placed at an angle to them so that the cross-sectional area of the settler diminishes in the direction of flow. The dispersion feed connection 6 is also shown in the drawing, which is connected at one end to the extraction mixing section (not shown in the drawing). In the feed end 2 of the settler there is a picket fence or other suitable directional element 7, with which the dispersion is spread across the whole width of the settler. The settler is also equipped with one damming member 8. The separated solutions are discharged at the rear end 3 of the settler, where first in the direction of flow there is the organic solution launder 9, into which the organic stream flows as the overflow and is routed onwards from there. The aqueous solution is collected in what is known as a water end 10, to which the aqueous solution flows below the organic solution launder.

Figure 3:
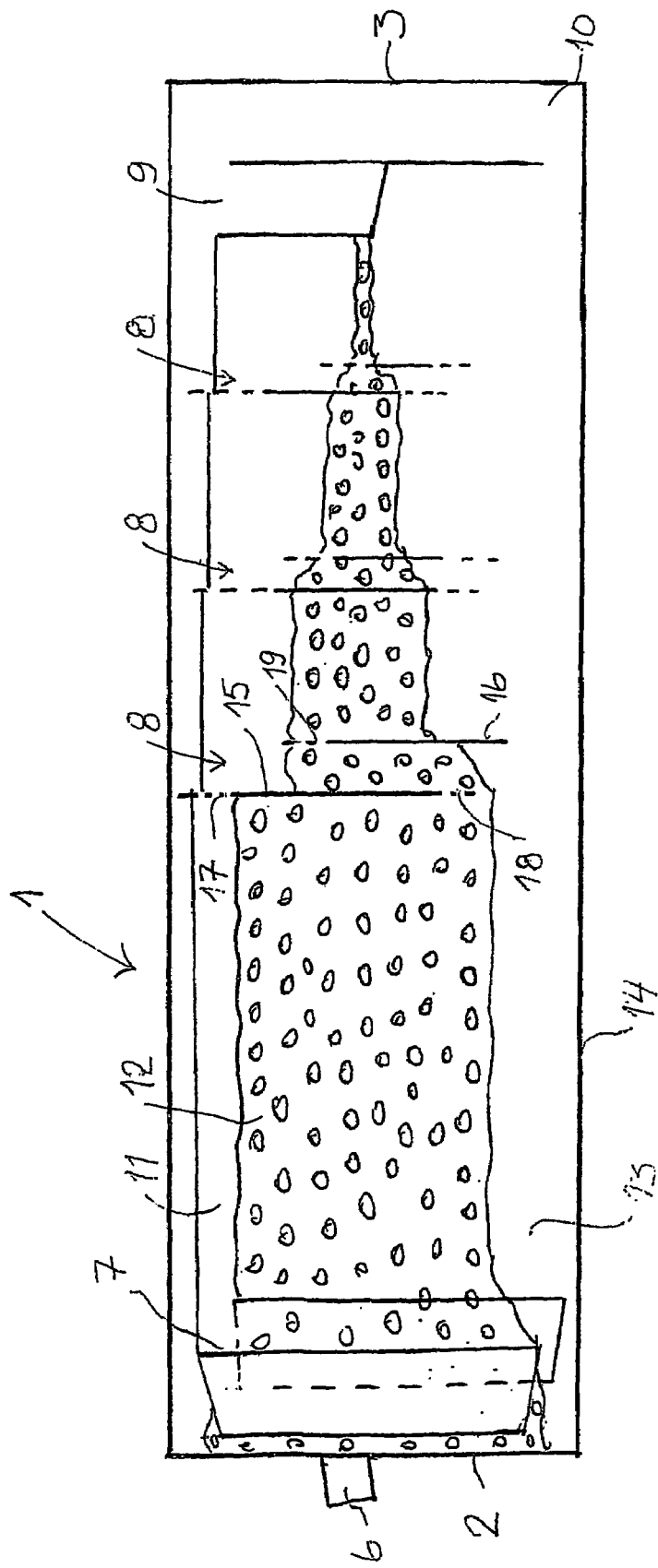
FIG. 3 is a vertical section of a settler, equipped with revert members.

FIG. 3 shows a side elevation of the settler in FIGS. 1 and 2. The drawing shows that in the front end of the settler the solutions have separated into their own phases only a little, the organic solution 11 above the dispersion 12 and the aqueous solution 13 under the dispersion on the bottom 14 of the settler. The dispersion band is dominant at the front end of the settler. In this case damming revert members 8 are further located in the settler, in this case three of them. Each revert member is composed of two revert plates 15 and 16 and the revert channel 17 formed between them. The revert plates are located in the settler so that they lie crosswise in relation to the longitudinal axis (the direction of flow), i.e. in the same direction as the feed and rear end of the settler. The section of the revert plates with vertical slots is shown in the side elevation by a dotted line; the rest of the plates are solid. Thus the top 17 of the first revert plate 15 is provided with vertical slots as is the bottom 18 of the plate and the top 19 of the second revert plate. The position of the revert member in the settler can be determined as required.

FIG. 3 shows that the distance of the revert plates from each other can also be changed so that the distance between them becomes smaller in the direction of flow. The distance between the plates is measured in such a way that the flow rate of the dispersion in the revert channel between them is of the order of 0.05-0.4 m/s. The vertical slots of the top of the first revert plate are dimensioned equally over the cross-section of the settler so that the flow rate of the organic phase flowing through them is in the range of 0.1-0.6 m/s.

Figure 4:
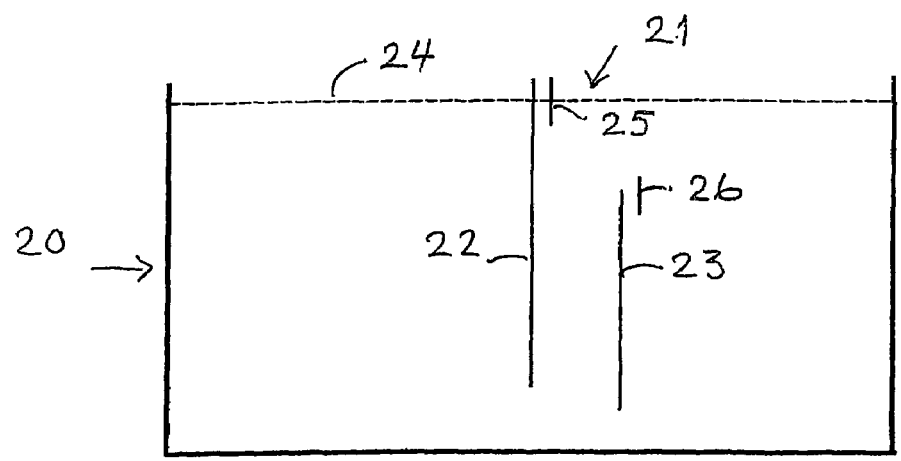
FIGS. 4-6 show a cross-section of a settler, where a revert member is located.

FIG. 4 is an example of one revert member 21 placed in a settler 20, which comprises two revert plates 22 and 23. The first revert plate 22 extends above the surface 24 of the organic solution. To simplify the drawing the vertical slotted section is not shown separately. Seen in the direction of flow, baffle plates 25 and 26 are located behind the upper part of each revert plate, made up of vertical plate strips, which are placed in between the gaps in the top of the revert plate. Vertical flow channels are formed between the strips, with a width much greater than that of the strips themselves. The baffle plates are in the form of a downward-facing comb, so that their upper edge is fixed. The distance of the baffle plates from the revert plate is 2-3 times the width of the revert plate slot. In this way it is possible to slow down and even out the flow entering the settler extension, which is conducive for improving the separating properties of the settler. The height of the baffle plates can be changed.

Figure 5:
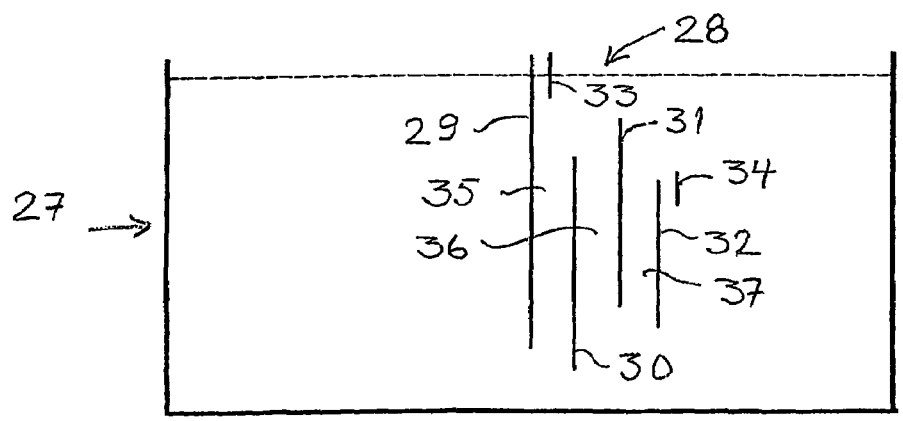

FIG. 5 represents a simplified settler 27, into which one revert member 28 has been placed, which in this case consists of four revert plates 29, 30, 31 and 32. Baffle plates 33 and 34 have again been placed in front of the top of the first and last revert plates. In the case of this drawing the dispersion flow has to flow through three revert channels, 35, 36 and 37, wherein the flow is almost vertical, either upward or downward. Vertical flows are excellent for making solutions separate from each other. During vertical flow small droplets in particular are brought into contact with their own phase and combine with it.

Figure 6:
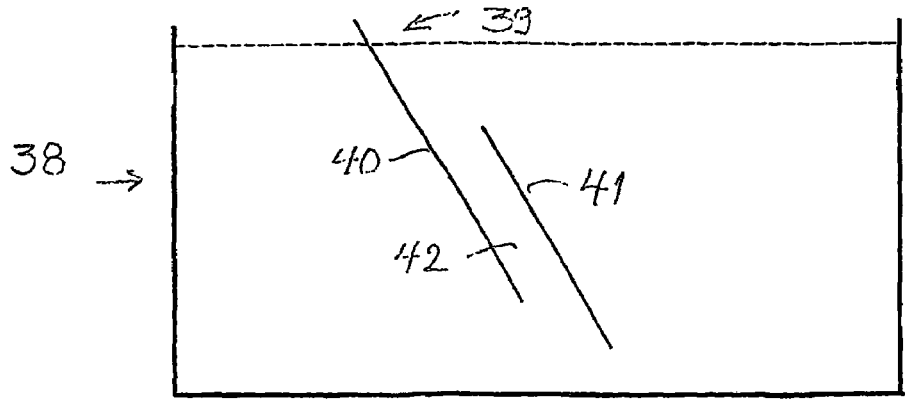

FIG. 6 shows an example of a settler 38 with only one revert member 39, which is formed of two revert plates 40 and 41.

The revert plates are now positioned at an angle rather than being upright, but nevertheless the dispersion band moving forward in revert channel 42 in effect has to rise vertically between the revert plates. Revert plates can therefore be positioned at an angle of between 50° and 90° to the horizontal. The inclination may be either towards the settler feed end as in FIG. 6 or they may be inclined towards the rear end of the settler. The inclination shown in FIG. 6 is a better alternative than the latter. It is appropriate to use inclined revert members when treating solutions that separate poorly.

The invention claimed is:

1. A method for controlling and compressing a dispersion formed from an aqueous solution and an organic solution in connection with the recovery of metals in a liquid-liquid extraction separation section, comprising reducing the cross-sectional area perpendicular to the longitudinal axis of the separation section in the direction of flow, wherein the height of a sidewall remains constant from a feed end to a rear end of the separation section, said separation section further comprising a plurality of revert members extending from one sidewall to the other, each said revert member comprising at least two revert plates, with the upstream revert plate of the revert member positioned elevated with respect to the downstream revert plate thereby causing the direction of the dispersion to turn essentially vertically in the revert channel between the revert plates causing the dispersion to dam up.

2. The method according to claim 1, wherein the cross-sectional area perpendicular to the longitudinal axis of the separation section is reduced symmetrically.

3. The method according to claim 1, wherein the cross-sectional area perpendicular to the longitudinal axis of the separation section is reduced asymmetrically.

4. The method according to claim 1, wherein the metal to be recovered is copper, uranium, cobalt, nickel or zinc.

5. The method according to claim 1, wherein the upper edge of the first revert plate of the revert member extends into the organic solution and causes the organic solution to flow partially through a slotted zone arranged in the top of the revert plate.

6. The method according to claim 1, wherein the first revert plate of the revert member causes the dispersion stream to dam-up and to flow under the first revert plate into the revert channel.

7. The method according to claim 1, wherein the dispersion that has flowed into the revert member flows over the last revert plate of the revert member into the separation section after the revert member.

8. The method according to claim 1, wherein the number of revert members located in the separation section is no more than 6.

9. Equipment for controlling and compressing a dispersion formed from an aqueous solution and an organic solution in connection with the recovery of metals in a liquid-liquid extraction process settler, which comprises a feed end, sidewalls, a rear end and a bottom, wherein the cross-sectional area perpendicular to the longitudinal axis of the settler reduces in the direction of flow, wherein the height of each sidewall remains constant from the feed end to the rear end of the settler, said settler further comprising a plurality of revert members extending from one sidewall to the other, each said revert member comprising at least revert plates, with the upstream revert plate of the revert member positioned elevated with respect to the downstream revert plate thereby causing the direction of the dispersion to turn essentially vertically in the revert channel between the revert plates causing the dispersion to dam up.

10. The equipment according to claim 9, wherein the feed end, the rear end, and the two sidewalls of the settler form a trapezium.

11. The equipment according to claim 9 wherein the settler is equipped with a picket fence.

12. The equipment according to claim 9, wherein the number of revert members is no more than 6.

13. The equipment according to claim 9, wherein the number of revert plates in the revert member is 2-6.

14. The equipment according to claim 9, wherein the upper edge of the first revert plate is located above the surface of the liquid in the settler.

15. The equipment according to claim 9, wherein the distance of the lower edge of the first revert plate from the bottom of the settler is 12-50% of the total depth of the solution in the settler.

16. The equipment according to claim 9, wherein the revert plates are mainly solid when seen in elevation.

17. The equipment according to claim 9, wherein the upper edge of the first revert plate consists of vertical slots of a length which corresponds to 5-15% of the total height of the revert plate.

18. The equipment according to claim 9, wherein the lower edge of the first and thereafter every second revert plate consists of vertical slots of a length which corresponds to 5-15% of the total height of the revert plate.

19. The equipment according to claim 9, wherein the upper edge of the second and subsequently every other revert plate consists of vertical slots of a length which corresponds to 5-15% of the total height of the revert plate.

20. The equipment according to claim 9, wherein the distance of the lower edge of the second revert plate from the bottom of the settler is 5-35% of the total depth of the solution in the settler.

21. The equipment according to claim 9, wherein the upper edge of the second revert plate is located below the surface of the solution, at a distance which is total 12-35% of the depth of the solution in the settler.

22. The equipment according to claim 9, wherein the revert plates of the revert member are located in the settler at an angle of 50-90% in relation to the horizontal.

23. The equipment according to claim 9, wherein the feed end of the settler is equipped with a picket fence.

* * * * *